United States Patent [19]

Woerner

[11] 3,900,504

[45] Aug. 19, 1975

[54] CUPRAMMONIUM ACETATE COMPLEX AND METHOD OF PREPARING

[75] Inventor: Hans Woerner, Mount Pleasant, N.C.

[73] Assignee: Mineral Research & Development Corporation, Charlotte, N.C.

[22] Filed: Feb. 4, 1972

[21] Appl. No.: 223,702

[52] U.S. Cl. ............................ 260/438.1; 260/438.1
[51] Int. Cl.$^2$ ............................................ C07F 1/08
[58] Field of Search ................................ 260/438.1

[56] References Cited
UNITED STATES PATENTS

| 1,589,644 | 6/1926 | Hedenburg | 424/140 |
|---|---|---|---|
| 1,598,982 | 9/1926 | Newhall | 424/140 |
| 1,988,752 | 1/1935 | Sessions | 424/140 |
| 2,159,864 | 5/1939 | Serciron | 260/438.1 |
| 2,383,784 | 8/1945 | Fleer | 260/438.1 |
| 2,423,619 | 7/1947 | Roon | 260/438.1 X |
| 2,434,402 | 1/1948 | Fleer | 260/438.1 |
| 2,441,400 | 5/1948 | Doumani et al. | 260/438.1 |
| 2,444,945 | 7/1948 | Morrell | 260/438.1 |
| 2,455,687 | 12/1948 | Liberthson | 260/438.1 |
| 2,604,485 | 7/1952 | Booker et al. | 260/438.1 |
| 2,651,648 | 9/1953 | Meyer | 260/438.1 |
| 2,695,858 | 11/1954 | Lisle | 260/438.1 |
| 2,824,886 | 2/1958 | Barry et al. | 260/438.1 |
| 3,078,213 | 2/1963 | Pomot et al. | 260/438.1 |
| 3,360,536 | 12/1967 | McKeon et al. | 260/438.1 |

OTHER PUBLICATIONS

Gauthier, Chemical Abstracts, Vol. 54, 16247e, (1960).

Grossman et al., Chemical Abstracts, Vol. 7, 2523[4], (1913).

*Primary Examiner*—Helen M. S. Sneed
*Attorney, Agent, or Firm*—Herbert M. Adrian, Jr.

[57] ABSTRACT

A fungicidal composition substantially non-corrosive to metals and suitable for spray type application comprising a cuprammonium acetate complex in a solution whose pH is slightly basic. The metal values are retained in solution in the critical pH range while the ammonium component is bound in the complex. The metal values are precipitated by hydrolyzing the complex as by way of substantial dilutions.

3 Claims, No Drawings

CUPRAMMONIUM ACETATE COMPLEX AND METHOD OF PREPARING

BACKGROUND OF THE INVENTION

This invention relates to a liquid or spray distributable type fungicide, and more particularly, to a noncorrosive cuprammonium fungicide and method for making same.

It should be appreciated that fungi are a large group of non-green plants that receive their energy and raw materials through parasitic habits and that they depend on the organic food made by photosynthesizing green plants. They represent a constant and ever present threat to many agricultural crops; i.e, tobacco, corn, peanuts. The control of fungi has been achieved through the use of a heterogenous group of chemicals, termed fungicides, that mitigate, inhibit, or destroy fungi. This has been accomplished by the spray or dust application of protective or eradicative fungicides.

Prior to 1939, the inorganic sulfur and copper compounds were used almost exclusively as spray and dust materials. Also, copper and organic mercury compounds found application as seed treatments. Copper sprays were introduced in 1882 as Bordeaux mixture for the control of downy mildew on grapes. As pointed out by D. E. H. Frear in "Chemistry of Insecticides, Fungicides, and Herbicides" 2nd Edition, D. Van Nostrand, New York, Sept. 1948, at page 212, the Bordeaux mixture consists of a light blue gelatinous precipitate suspended in water, and formed, for example, by reacting 4 pounds of copper sulphate, 4 pounds of hydrated lime (calcium hydroxide) to 50 gallons of water. Frear attests to the fact that wide variations in the composition of the resulting mixture will result as the ratio between the components is changed.

To round out the picture, it should be noted that mildew, a spore forming fungus, appears also on fabrics. The most popular inorganic inhibitors for these fungi are likewise compounds of copper, typified by cuprammonia derivatives. This point is developed by G. L. Clark in the "Encyclopedia of Chemistry" Reinhold Publishing Company, L.C. 57-7142, New York, 1957, at pages 428–430 and 602.

At page 218 of the Frear reference there are described cuprammonium compounds such as "Eau Celeste" developed in 1886 as an improvement over Bordeaux mixture, Eau Celeste being the reaction product of ammonium hydroxide added to a solution of copper sulphate to form a dark blue solution. There is an apparent conflict between experts as to the exact structural nature of the cuprammonium complex. However, it is observed that the cuprammonium salt is apparently readily decomposed with the release of ammonia to form the basic sulphate. Parenthetically, dilution of Eau Celest forms a floc of basic copper sulphate. When Eau Celeste is applied as a spray, the deposit consists of basic copper sulphate and some ammonium sulphate, the copper salt being relatively insoluble and harmless to green plants but still sufficiently soluble to be toxic to fungi.

It is well known that copper in solution attacks brass; i.e., $CuCl_2$ is used as an etchant. Furthermore, cuprammonia is a much more powerful corrosive than either copper or ammonium ion individually. Parenthetically, brass is used in pumps, valves, nozzles and other portions of typical fungicidal spray distribution systems. This corrosiveness is well documented by Rumford, "Chemical Engineering Materials" 1st American Edition at page 194.

If the ammonia in a spray type cuprammonium fungicide solution is bound by simply changing the pH, then as the pH of 7 is approached on the alkaline side, the copper quantitatively turns to an insoluble form which settles to the bottom of storage containers. On the other hand, if the copper is prevented from precipitating with chelating agents such as EDTA (ethylene diamine tetra acetate), it will not deposit the active adherent form of copper required to protect the plants.

SUMMARY

It is an object of this invention to devise a fungicide including a copper inorganic compound such as cuprammonium compounds suitable for spray type distribution and non-corrosive to metal surfaces.

It is yet another object that the storage properties of the fungicide be improved in that the metal values be retained in true solution under pH conditions where it would normally be expected to be insoluble. It is a related object that fungicides having metallic ammonia complexes bind the ammonia without precipitating the metal values.

It was unexpectedly observed that the foregoing objects could be satisfied by reacting ammonium acetate and copper acetate dehydrate in fixed proportions to a dilute ammonium hydroxide solution, the resulting system having a slightly basic pH and a fixed copper percentage. Alternatively, the same result was achieved by adding acetic acid to a high ammonia concentration of copper.

It should be noted, that acetic acid or acetates in conjunction with copper are not ordinarily considered solubilizing (chelating) agents for copper. To the contrary, the presence of acetic acid or acetates is considered to lower the solubility of copper salts. Illustratively, the nitrates, chlorides, and sulfates of copper all have solubilities several times that of copper acetate. In addition to making the ocpper soluble at pH conditions where it normally would be precipitated, the reaction product retains the precipitate characteristics found in prior art cuprammonia complexes. This is accomplished by depositing a hydroxide form of copper rather than a basic acetate upon the copper acetate solution being diluted.

DESCRIPTION OF THE PREFERRED EMBODIMENT

Now, in accordance with the present invention, it has been found for example, that 132 pounds of copper acetate dihydrate reacted at room temperature and pressure with 20 pounds of ammonium acetate in a solution of 220 pounds water and 100 pounds of aqua ammonia (29% $NH_3$) will yield a cuprammonium acetate complex in a solution having a pH lying between about 7.1 to about 7.4 and a copper content from about 8% to about 8.2%.

Experience in attempting a structural determination of the reaction product of this invention by the usual analytic chemical techniques of functional group analysis, degradative structural analysis, and the separation and identification of residues has been inconclusive. It is believed that the reaction product is a cuprammonium acetate complex having the monomer molecular form $Cu(NH_3)_2(O \cdot CO \cdot CH_3)_2$.

Although the following is not necessary for the complete understanding and successful practice of this invention, the following examples are presented to show the surprising results which may be attained by the use of the present noncorrosive cuprammonium fungicide. It is emphasized that these examples are merely illustrative, and the invention should in no way be construed as limited thereby.

EXAMPLE 1

In this experiment cuprammonium acetate and cuprammonium carbonate were diluted and the amount of copper precipitate was measured. This illustrates the deposition control property of the composition according to this invention. At the end of this time period the copper count in terms of the grams per liter left in solution and the per cent copper precipitated were measured for each dilution ratio.

| Cuprammonium Acetate Complex 8% Cu | | | | | |
|---|---|---|---|---|---|
| Dilution | 3:1 | 6:1 | 30:1 | 60:1 | 100:1 |
| Gr Cu/Liter left in sol. | 16.15 | 6.78 | 0.40 | 0.15 | 0.038 |
| % Cu precipitated | 30.39 | 48.91 | 86.67 | 90.14 | 95.86 |
| Copper Ammonium Carbonate 8% Cu | | | | | |
| Dilution | 3:1 | 6:1 | 30:1 | 60:1 | 100:1 |
| Gr Cu/liter left in sol. | 23.76 | 13.10 | 2.976 | 1.296 | 0.54 |
| % Cu precipitated | 1.02 | 4.59 | 4.00 | 17.45 | 43.16 |

EXAMPLE 2

Two identical brass surfaces were exposed at least 48 hours in respective solutions of cuprammonium acetate and cuprammonium carbonate. The object of this test was to determine the difference, if any, in the corrosion rates of the brass as a function of exposure to these solutions.

It was observed that the corrosion rate of brass exposed to the acetate in terms of weight loss after 48 hours, was 0.582 grams or an absolute rate of 0.0102 inches per month. In contrast the carbonate caused a brass weight loss of 13.61 grams at an absolute rate of 0.2417 inches per month.

While the invention has been particularly shown and described with reference to a preferred embodiment thereof, it will be understood from those skilled in the art that various changes in form and details may be made therein without departing from the spirit and scope of the invention.

What is claimed is:

1. A method for producing a substantially non-corrosive cuprammonium acetate complex comprising reacting at atmospheric temperature and pressure copper acetate and ammonium acetate in a dilute aqueous ammonia solution at a pH between about 7.1 to 7.4, said reaction proportions being in amounts to provide an aqueous solution having a copper content of about 8 to 8.2 percent by weight.

2. The method of claim 1 wherein the copper acetate is reacted in said aqueous ammonia solution with ammonium acetate in a weight ratio of about 13 to 2 wherein the copper acetate is measured as the dihydrate.

3. The method of claim 2 wherein the complex is formed by reacting weight proportions of about 13 parts of copper acetate as measured as the dihydrate, about 2 parts of ammonium acetate, about 10 parts of 29 percent aqueous ammonia in about 22 parts of water.

* * * * *